(12) United States Patent
Wang et al.

(10) Patent No.: US 10,631,209 B2
(45) Date of Patent: Apr. 21, 2020

(54) TIME SYNCHRONIZATION METHOD, DEVICE, AND SYSTEM

(71) Applicant: Huawei Technologies Co., Ltd., Shenzhen (CN)

(72) Inventors: Man Wang, Shanghai (CN); Jun Hu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 9 days.

(21) Appl. No.: 15/890,774

(22) Filed: Feb. 7, 2018

(65) Prior Publication Data

US 2018/0167849 A1 Jun. 14, 2018

Related U.S. Application Data

(63) Continuation of application No. PCT/CN2015/086405, filed on Aug. 7, 2015.

(51) Int. Cl.
*H04W 36/00* (2009.01)
*H04B 7/26* (2006.01)
*H04W 56/00* (2009.01)

(52) U.S. Cl.
CPC ...... *H04W 36/0016* (2013.01); *H04B 7/2687* (2013.01); *H04W 36/0033* (2013.01);
(Continued)

(58) Field of Classification Search
CPC ......... H04W 36/0016; H04W 36/0033; H04W 36/0072; H04W 36/0077; H04W 56/00; H04B 7/2687
See application file for complete search history.

(56) References Cited

U.S. PATENT DOCUMENTS 6,628,642 B1 * 9/2003 Mile'n ................. H04B 7/2687
370/331
2001/0022779 A1 * 9/2001 Wheatley, III ....... H04B 1/7075
370/252
(Continued)

FOREIGN PATENT DOCUMENTS

CN 101404540 A 4/2009
CN 102547961 A 7/2012
(Continued)

OTHER PUBLICATIONS

LG Electronics Inc., "Dedicated signatures choice and signaling," 3GPP TSG-RAN WG2 #60 R2-075020, Jeju, Korea, Nov. 5-9, 2007, 5 pages.

*Primary Examiner* — Jenee Holland
(74) *Attorney, Agent, or Firm* — Slater Matsil, LLP

(57) ABSTRACT

A method is provided. The method includes: receiving a handover request, from a source base station, for requesting to perform time synchronization with a target base station; and sending handover request acknowledgement information to the source base station, where the handover request acknowledgement information includes information used to indicate whether the source base station performs time synchronization with the target base station. The source base station may determine, according to the handover request acknowledgement information sent by the target base station, whether the source base station needs to perform time synchronization with the target base station.

15 Claims, 6 Drawing Sheets

(52) U.S. Cl.
CPC ....... *H04W 36/0072* (2013.01); *H04W 56/00* (2013.01); *H04W 56/001* (2013.01); *H04W 56/002* (2013.01); *H04W 36/0077* (2013.01)

(56) References Cited

U.S. PATENT DOCUMENTS

| | | | | | |
|---|---|---|---|---|---|
| 2002/0193113 | A1* | 12/2002 | Sayeedi | ............ | H04W 36/0055 455/439 |
| 2004/0185852 | A1* | 9/2004 | Son | ........................ | H04W 36/12 455/438 |
| 2004/0192390 | A1* | 9/2004 | Tajima | .................. | H04W 36/18 455/561 |
| 2004/0202119 | A1* | 10/2004 | Edge | .................... | H04B 7/2687 370/324 |
| 2005/0124344 | A1* | 6/2005 | Laroia | .................. | H04W 36/18 455/436 |
| 2005/0124345 | A1* | 6/2005 | Laroia | .................. | H04W 36/06 455/437 |
| 2006/0193306 | A1* | 8/2006 | Higure | ................ | H04W 56/002 370/350 |
| 2006/0239229 | A1* | 10/2006 | Marinescu | ........ | H04W 36/0022 370/331 |
| 2006/0270406 | A1* | 11/2006 | Kim | .................. | H04W 36/0055 455/436 |
| 2007/0149206 | A1* | 6/2007 | Wang | ................ | H04W 36/0077 455/450 |
| 2007/0293224 | A1* | 12/2007 | Wang | ................ | H04W 36/0055 455/436 |
| 2007/0293225 | A1* | 12/2007 | Kangude | ............ | H04W 36/165 455/436 |
| 2008/0014953 | A1* | 1/2008 | Wong | .................. | H04W 74/002 455/450 |
| 2008/0130585 | A1* | 6/2008 | Park | .................. | H04W 36/0083 370/332 |
| 2008/0267131 | A1* | 10/2008 | Kangude | .......... | H04W 36/0072 370/331 |
| 2009/0046573 | A1* | 2/2009 | Damnjanovic | ...... | H04J 11/0093 370/216 |
| 2009/0181680 | A1* | 7/2009 | Kim | .................. | H04W 36/0079 455/439 |
| 2009/0253434 | A1* | 10/2009 | Hayashi | ................ | H04W 92/20 455/436 |
| 2009/0257398 | A1* | 10/2009 | Koyanagi | ............ | H04W 48/18 370/331 |
| 2009/0274086 | A1* | 11/2009 | Petrovic | .............. | H04J 11/0093 370/312 |
| 2009/0298515 | A1 | 12/2009 | Czaja et al. | | |
| 2010/0002650 | A1* | 1/2010 | Ahluwalia | .......... | H04L 1/1874 370/331 |
| 2010/0022250 | A1* | 1/2010 | Petrovic | .............. | H04J 11/0093 455/450 |
| 2010/0035616 | A1* | 2/2010 | Sebire | .................. | H04W 36/02 455/436 |
| 2010/0046476 | A1* | 2/2010 | Qiu | ........................ | H04W 36/02 370/331 |
| 2010/0103889 | A1* | 4/2010 | Kim | .................. | H04W 74/004 370/329 |
| 2010/0130208 | A1* | 5/2010 | Hayashi | ................ | H04W 36/02 455/436 |
| 2010/0210255 | A1* | 8/2010 | Amirijoo | ............ | H04W 74/002 455/419 |
| 2010/0232327 | A1* | 9/2010 | Kim | ...................... | H04W 36/36 370/311 |
| 2011/0058529 | A1* | 3/2011 | Uemura | ............ | H04W 36/0077 370/331 |
| 2012/0008524 | A1* | 1/2012 | Amirijoo | ............ | H04W 24/10 370/252 |
| 2012/0046065 | A1* | 2/2012 | Amirijoo | .............. | H04W 16/10 455/524 |
| 2012/0302240 | A1* | 11/2012 | Tamaki | ............ | H04W 36/0011 455/436 |
| 2013/0051298 | A1* | 2/2013 | Drevo | ............... | H04W 36/0007 370/312 |
| 2013/0070726 | A1 | 3/2013 | Zhang et al. | | |
| 2013/0100931 | A1* | 4/2013 | Kim | ........................ | H04L 5/001 370/331 |
| 2013/0265992 | A1 | 10/2013 | Deng et al. | | |
| 2014/0286261 | A1 | 9/2014 | Vujcic | | |
| 2015/0103819 | A1* | 4/2015 | Fujishiro | ........... | H04W 56/0015 370/350 |
| 2015/0208283 | A1* | 7/2015 | Yang | ...................... | H04W 36/04 370/331 |
| 2015/0351061 | A1* | 12/2015 | Kim | ...................... | H04W 56/00 370/252 |
| 2015/0381431 | A1* | 12/2015 | Jung | .................... | H04L 41/0816 370/329 |
| 2016/0100374 | A1* | 4/2016 | Choi | ................... | H04W 56/0015 370/331 |
| 2016/0192399 | A1* | 6/2016 | Zhu | ................... | H04W 36/0022 370/331 |
| 2016/0205692 | A1* | 7/2016 | Zhang | .................. | H04W 48/12 370/329 |
| 2017/0041841 | A1* | 2/2017 | Pedersen | ........... | H04W 56/0045 |
| 2017/0055234 | A1* | 2/2017 | Seo | .................. | H04W 72/0446 |
| 2017/0078933 | A1* | 3/2017 | Li | ..................... | H04W 36/0077 |
| 2017/0127323 | A1* | 5/2017 | Peleg | ................. | H04B 7/18541 |
| 2017/0215119 | A1* | 7/2017 | Hong | .................... | H04W 36/08 |
| 2017/0367059 | A1* | 12/2017 | Park | ...................... | H04W 36/30 |
| 2018/0115930 | A1* | 4/2018 | Belleschi | .......... | H04W 36/0072 |
| 2018/0167849 | A1* | 6/2018 | Wang | .................... | H04W 56/00 |

FOREIGN PATENT DOCUMENTS

| | | |
|---|---|---|
| CN | 102948230 A | 2/2013 |
| CN | 103797869 A | 5/2014 |
| CN | 104168639 A | 11/2014 |
| JP | 2013093730 A | 5/2013 |
| WO | 2006103547 A1 | 10/2006 |
| WO | 2009045160 A1 | 4/2009 |
| WO | 2015000104 A1 | 1/2015 |

* cited by examiner

TIME SYNCHRONIZATION METHOD, DEVICE, AND SYSTEM

CROSS-REFERENCE TO RELATED APPLICATIONS

This application is a continuation of International Application No. PCT/CN2015/086405, filed on Aug. 7, 2015, which is hereby incorporated by reference in its entirety.

TECHNICAL FIELD

The present disclosure relates to the communications field, and in particular, to a time synchronization method, device, and system.

BACKGROUND

In a wireless communications system, a user equipment (UE) can perform wireless communication with another UE using a base station. To avoid signal interference between base stations, time synchronization needs to be implemented between the base stations. With development of services such as a multimedia broadcast/multicast service (MBMS) and coordinated multipoint transmission/reception (CoMP) in the wireless communications system, there is an increasingly high accuracy requirement on time synchronization between the base stations.

In a related technology, time synchronization between base stations may be implemented in a process of handing over UE from a source base station to a target base station. A specific process is as follows. The source base station may select a designated base station as the target base station according to a neighboring cell detection report sent by a target UE, and send a handover request to the target base station. The target base station may select, according to the handover request from a plurality of preambles (obtained from a plurality of root sequences) of a cell belonging to the target base station, a preamble as a random access preamble of the target UE. The target base station may send handover request acknowledgement information to the source base station, where the handover request acknowledgement information includes the random access preamble. After receiving the request acknowledgement information, the source base station may start to perform blind detection on the random access preamble and send a handover instruction to the target UE, where the handover instruction includes the random access preamble. Then, the target UE sends the random access preamble to the target base station, the target base station records a first moment at which the random access preamble is received, and the source base station records a second moment at which the random access preamble is detected. The target base station sends the first moment to the source base station. The source base station calculates a time difference between the first moment and the second moment, and then adjusts time of the source base station according to the time difference, so as to implement time synchronization between the target base station and the source base station.

During a process of implementing the present disclosure, the inventors find that at least the following problem exists in the related technology.

The handover request acknowledgement information sent by the target base station to the source base station indicates that the source base station performs time synchronization with the target base station. After receiving the handover request acknowledgement information, the source station starts to perform blind detection on the random access preamble. Content of the handover request acknowledgement information sent by the target base station is relatively simple, resulting in relatively low flexibility in performing time synchronization between the source base station and the target base station in the handover process.

SUMMARY

To improve accuracy of time synchronization between base stations, the present disclosure provides a time synchronization method, device, and system. The technical solutions are as follows.

According to a first aspect, a time synchronization method is provided. The method may be implemented by a target base station. The method includes receiving a handover request, sent by a source base station, for requesting to perform time synchronization with the target base station. The method also includes sending handover request acknowledgement information to the source base station, where the handover request acknowledgement information includes information that indicates whether time synchronization between the target base station and the source base station will subsequently be performed.

With reference to the first aspect, in a first possible implementation of the first aspect, the sending handover request acknowledgement information to the source base station includes sending the handover request acknowledgement information to the source base station. The handover request acknowledgement information includes synchronization information indicating time synchronization between the source base station and the target base station will subsequently be performed. The synchronization information includes a target preamble, that uniquely identifies time synchronization, in a single root sequence. The synchronization information further instructs the source base station to send a handover command to user equipment (UE). The handover command includes the target preamble.

With reference to the first possible implementation of the first aspect, in a second possible implementation of the first aspect, before the sending the handover request acknowledgement information to the source base station, the method further includes: detecting whether a root sequence on which no preamble allocation has been performed exists in a root sequence stored in the target base station. If the root sequence on which no preamble allocation has been performed exists in the root sequence stored in the target base station, the method includes selecting a target root sequence from the root sequence on which no preamble allocation has been performed. The method also includes determining the target preamble in the target root sequence.

With reference to the second possible implementation of the first aspect, in a third possible implementation of the first aspect, the root sequence stored in the target base station includes a blind detection root sequence used for blind detection. The detecting whether a root sequence on which no preamble allocation has been performed exists in a root sequence stored in the target base station includes: detecting whether preamble allocation has been performed on the blind detection root sequence. The selecting a target root sequence from the root sequence on which no preamble allocation has been performed, if the root sequence on which no preamble allocation has been performed exists in the root sequence stored in the target base station, includes: if no preamble allocation has been performed on the blind detection root sequence, determining the blind detection root sequence as the target root sequence.

With reference to the third possible implementation of the first aspect, in a fourth possible implementation of the first aspect, the detecting, according to the handover request, whether a root sequence on which no preamble allocation has been performed exists in a root sequence stored in the target base station further includes: if preamble allocation has been performed on the blind detection root sequence, detecting whether a root sequence on which no preamble allocation has been performed exists in another root sequence stored in the target base station. The another root sequence is a root sequence, different from the blind detection root sequence, in root sequences stored in the target base station. If the root sequence on which no preamble allocation has been performed exists in the root sequence stored in the target base station, the detecting, according to the handover request, whether a root sequence on which no preamble allocation has been performed exists in a root sequence stored in the target base station further includes selecting the target root sequence from the root sequence on which no preamble allocation has been performed.

With reference to the second possible implementation of the first aspect, in a fifth possible implementation of the first aspect, the detecting whether a root sequence on which no preamble allocation has been performed exists in a root sequence stored in the target base station further includes: if the root sequence on which no preamble allocation has been performed does not exist in the root sequence stored in the target base station, sending the handover request acknowledgement information to the source base station. The handover request acknowledgement information includes target-preamble allocation failure information indicating that the source base station cannot perform time synchronization with the target base station.

With reference to any one the first aspect, or the first possible implementation of the first aspect to the fifth possible implementation of the first aspect, in a sixth possible implementation of the first aspect, after sending handover request acknowledgement information to the source base station, the method further includes: obtaining a first moment, where the first moment is a moment at which the target base station receives the target preamble sent by the UE. The method further includes sending the first moment to the source base station, so that the source base station calculates a time difference between the first moment and a second moment, and performs time adjustment according to the time difference. The second moment is a moment at which the target preamble sent by the UE to the target base station is detected by the source base station.

With reference to the sixth possible implementation of the first aspect, in a seventh possible implementation of the first aspect, obtaining the first moment includes receiving a random access message sent by the UE. The random access message includes the target preamble. Obtaining the first moment also includes determining a moment at which the target preamble is detected as the first moment. The sending the first moment to the source base station includes sending a resource release message to the source base station, where the resource release message includes the first moment.

According to a second aspect, a time synchronization device is provided, and is used for a target base station. The device includes a receiving unit, configured to receive a handover request, sent by a source base station, for requesting to perform time synchronization with the target base station. The device also includes a first sending unit, configured to send handover request acknowledgement information to the source base station. The handover request acknowledgement information includes information indicating whether time synchronization between the source base station and the target base station will subsequently be performed.

With reference to the second aspect, in a first possible implementation of the second aspect, the first sending unit includes: a sending subunit, configured to send the handover request acknowledgement information to the source base station. The handover request acknowledgement information includes synchronization information indicating time synchronization between the source base station and the target base station will subsequently be performed. The synchronization information includes a target preamble, uniquely identifying time synchronization, in a single root sequence. The synchronization information is further used to instruct the source base station to send a handover command to user equipment UE, and the handover command includes the target preamble.

With reference to the first possible implementation of the second aspect, in a second possible implementation of the second aspect, the first sending unit further includes: a detection subunit, configured to detect whether a root sequence on which no preamble allocation has been performed exists in a root sequence stored in the target base station. The first sending unit further includes a selection subunit, configured to: when the root sequence on which no preamble allocation has been performed exists in the root sequence stored in the target base station, select a target root sequence from the root sequence on which no preamble allocation has been performed. The first sending unit further includes a determining subunit, configured to determine the target preamble in the target root sequence.

With reference to the second possible implementation of the second aspect, in a third possible implementation of the second aspect, the root sequence stored in the target base station includes a blind detection root sequence used for blind detection. The detection subunit is further configured to detect whether preamble allocation has been performed on the blind detection root sequence. The selection subunit is further configured to, when no preamble allocation has been performed on the blind detection root sequence, determine the blind detection root sequence as the target root sequence.

With reference to the third possible implementation of the second aspect, in a fourth possible implementation of the second aspect, the detection subunit is further configured to: when preamble allocation has been performed on the blind detection root sequence, detect whether a root sequence on which no preamble allocation has been performed exists in another root sequence stored in the target base station, where the another root sequence is a root sequence, different from the blind detection root sequence, in root sequences stored in the target base station; and when the root sequence on which no preamble allocation has been performed exists in the root sequence stored in the target base station, select the target root sequence from the root sequence on which no preamble allocation has been performed.

With reference to the fourth implementation of the second aspect, in a fifth implementation of the second aspect, the detection subunit is further configured to: when the root sequence on which no preamble allocation has been performed does not exist in the root sequence stored in the target base station, send the handover request acknowledgement information to the source base station. The handover request acknowledgement information includes target-preamble allocation failure information indicating that the source base station cannot perform time synchronization with the target base station.

With reference to any one of the second aspect, or the first possible implementation of the second aspect to the fifth possible implementation of the second aspect, in a sixth possible implementation of the second aspect, the device further includes: a first obtaining unit, configured to obtain a first moment, where the first moment is a moment at which the target base station receives the target preamble sent by the UE. The device further includes a second sending unit, configured to send the first moment to the source base station, so that the source base station calculates a time difference between the first moment and a second moment, and performs time adjustment according to the time difference. The second moment is a moment at which the target preamble sent by the UE to the target base station is detected by the source base station.

With reference to the sixth possible implementation of the second aspect, in a seventh possible implementation of the second aspect, the first obtaining unit is configured to: receive a random access message sent by the UE. The random access message includes the target preamble. The first obtaining unit is further configured to determine a moment at which the target preamble is detected as the first moment. The second sending unit is configured to: send a resource release message to the source base station, where the resource release message includes the first moment.

According to a third aspect, a time synchronization device is provided, and is used for a target base station. The device includes a transmitter, a receiver, and a processor. The receiver is configured to receive a handover request, sent by a source base station, for requesting to perform time synchronization with the target base station. The transmitter is configured to send handover request acknowledgement information to the source base station. The handover request acknowledgement information includes information indicating whether time synchronization between the source base station and the target base station will be performed.

With reference to the third aspect, in a first possible implementation of the third aspect, the transmitter is further configured to: send the handover request acknowledgement information to the source base station. The handover request acknowledgement information includes synchronization information indicating time synchronization between the source base station and the target base station will be performed. The synchronization information includes a target preamble, uniquely identifying time synchronization, in a single root sequence. The synchronization information further instructs the source base station to send a handover command to user equipment UE, and the handover command includes the target preamble.

With reference to the first possible implementation of the third aspect, in a second possible implementation of the third aspect, the processor is configured to: detect whether a root sequence on which no preamble allocation has been performed exists in a root sequence stored in the target base station. When the root sequence on which no preamble allocation has been performed exists in the root sequence stored in the target base station, the processor is further configured to select a target root sequence from the root sequence on which no preamble allocation has been performed; and determine the target preamble in the target root sequence.

With reference to the second possible implementation of the third aspect, in a third possible implementation of the third aspect, the root sequence stored in the target base station includes a blind detection root sequence used for blind detection. The processor is further configured to: detect whether preamble allocation has been performed on the blind detection root sequence. The processor is further configured to: when no preamble allocation has been performed on the blind detection root sequence, determine the blind detection root sequence as the target root sequence.

With reference to the third possible implementation of the third aspect, in a fourth possible implementation of the third aspect, the processor is further configured to: when preamble allocation has been performed on the blind detection root sequence, detect whether a root sequence on which no preamble allocation has been performed exists in another root sequence stored in the target base station. The another root sequence is a root sequence, different from the blind detection root sequence, in root sequences stored in the target base station. When the root sequence on which no preamble allocation has been performed exists in the root sequence stored in the target base station, the processor is further configured to select the target root sequence from the root sequence on which no preamble allocation has been performed.

With reference to the third possible implementation of the third aspect, in a fifth possible implementation of the third aspect, the transmitter is further configured to: when the root sequence on which no preamble allocation has been performed does not exist in the root sequence stored in the target base station, send the handover request acknowledgement information to the source base station. The handover request acknowledgement information includes target-preamble allocation failure information indicating that the source base station cannot perform time synchronization with the target base station.

With reference to any one of the third aspect, or the first possible implementation of the third aspect to the fifth possible implementation of the third aspect, in a sixth possible implementation of the third aspect, the processor is further configured to obtain a first moment. The first moment is a moment at which the target base station receives the target preamble sent by the UE. The transmitter is further configured to send the first moment to the source base station, so that the source base station calculates a time difference between the first moment and a second moment, and performs time adjustment according to the time difference. The second moment is a moment at which the target preamble sent by the UE to the target base station is detected by the source base station.

With reference to the sixth possible implementation of the third aspect, in a seventh possible implementation of the third aspect, the processor is further configured to: receive a random access message sent by the UE, where the random access message includes the target preamble; and determine a moment at which the target preamble is detected as the first moment. The transmitter is further configured to: send a resource release message to the source base station, where the resource release message includes the first moment.

According to a fourth aspect, a time synchronization system is provided, including a source base station, a target base station, and user equipment. The target base station includes the time synchronization device according to any possible implementation of the second aspect.

According to a fifth aspect, a time synchronization system is provided, including a source base station, a target base station, and user equipment. The target base station includes the time synchronization device according to any possible implementation of the third aspect.

Beneficial effects of the technical solutions provided in the present disclosure are as follows.

According to the time synchronization method, device, and system that are provided in the present disclosure, the handover request acknowledgement information sent by the target base station to the source base station includes the information indicating whether time synchronization between the source base station and the target base station will be performed. Therefore, the source base station may determine, according to the handover request acknowledgement information, whether the source base station needs to perform time synchronization with the target base station. In this way, content of the handover request acknowledgement information sent by the target base station is enriched, and flexibility in performing time synchronization between the source base station and the target base station in a handover process is improved. In addition, the target base station may select, according to the handover request, the target root sequence from the root sequence that is stored in the target base station and on which no preamble allocation has been performed, and determine the target preamble in the target root sequence. Because the target preamble is a unique preamble in the target root sequence, accuracy of detecting the target preamble by the source base station is improved, and accuracy of time synchronization between the source base station and the target base station is improved.

It should be understood that, the foregoing general description and the following detailed description are merely illustrative and explanatory, and cannot be used to limit the present disclosure.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

FIG. 3-1 is a flowchart of another time synchronization method according to an embodiment of the present disclosure;

FIG. 3-2 is a flowchart of a method for determining a target root sequence according to an embodiment of the present disclosure;

FIG. 3-3 is a schematic diagram of a wireless communications network according to an embodiment of the present disclosure;

FIG. 4-1 is a schematic structural diagram of a time synchronization device according to an embodiment of the present disclosure;

FIG. 4-2 is a schematic structural diagram of a first sending unit according to an embodiment of the present disclosure;

FIG. 4-3 is a schematic structural diagram of another first sending unit according to an embodiment of the present disclosure;

FIG. 4-4 is a schematic structural diagram of another time synchronization device according to an embodiment of the present disclosure.

The foregoing accompanying drawings show specific embodiments of the present disclosure, and more detailed descriptions are provided in the following. The accompanying drawings and text descriptions are not intended to limit the scope of the idea of the present disclosure in any manner, but are intended to describe the concept of the present disclosure for a person skilled in the art with reference to particular embodiments.

DETAILED DESCRIPTION OF ILLUSTRATIVE EMBODIMENTS

To make the objectives, technical solutions, and advantages of the present disclosure clearer, the following further describes the embodiments of the present disclosure in detail with reference to the accompanying drawings.

Figure 1:
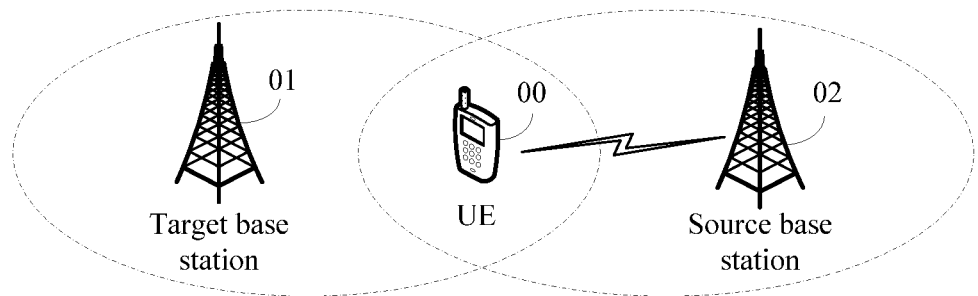
FIG. 1 is a schematic diagram of an environment of a time synchronization system to which a time synchronization method is applied according to an embodiment of the present disclosure.

FIG. 1 is a schematic diagram of an environment of a time synchronization system to which a time synchronization method is applied according to an embodiment of the present disclosure. The time synchronization system includes UE 00, a target base station 01, and a source base station 02. When the UE 00 needs to be handed over from a cell covered by the source base station 02 to a cell covered by the target base station 01, the UE 00 may send a random access message to the target base station 01. The target base station 01 records a first moment at which the random access message is received, and the source base station 02 records a second moment at which the random access message is detected. The target base station 01 sends the first moment to the source base station 02. The source base station 02 calculates a time difference between the first moment and the second moment, and performs time adjustment according to the time difference. As such, time synchronization is implemented between the source base station and the target base station. The time synchronization system may be a system of a different standard, and correspondingly, the target base station 01 and the source base station 02 may be different devices. For example, when the time synchronization system is a Long Term Evolution (LTE for short) system, the target base station 01 and the source base station 02 may be evolved NodeBs (eNodeB for short); when the time synchronization system is a Global System for Mobile Communications (GSM for short) or a Code Division Multiple Access (CDMA for short) system, the target base station 01 and the source base station 02 may be base station controllers (BSC for short); when the time synchronization system is a Universal Mobile Telecommunications System (UMTS for short), the target base station 01 and the source base station 02 may be radio network controllers (RNC for short). This is not limited in this embodiment of the present disclosure.

Figure 2:
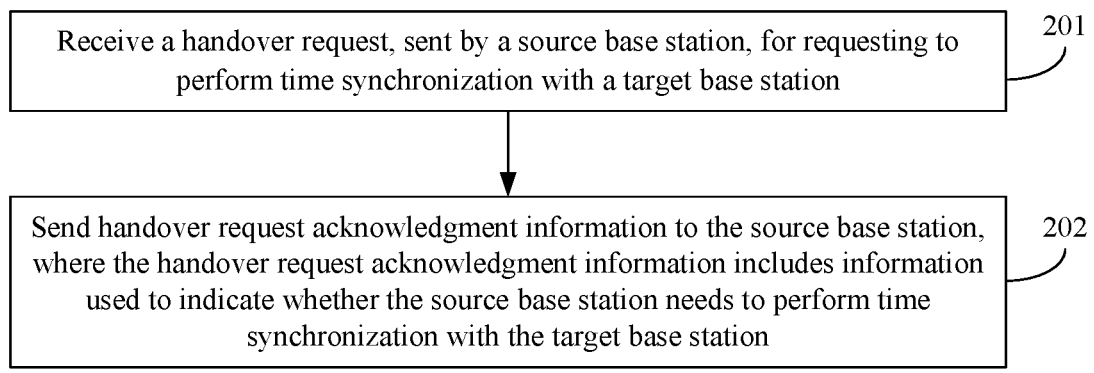
FIG. 2 is a flowchart of a time synchronization method according to an embodiment of the present disclosure.

An embodiment of the present disclosure provides a time synchronization method that is used for a target base station. As shown in FIG. 2, the method includes the following steps.

Step 201. Receive a handover request, sent by a source base station, for requesting to perform time synchronization with the target base station.

Step 202. Send handover request acknowledgement information to the source base station. The handover request acknowledgement information includes information indicating whether time synchronization between the source base station and the target base station will be performed.

In conclusion, according to the time synchronization method provided in this embodiment of the present disclosure, the handover request acknowledgement information sent by the target base station to the source base station includes the information indicating whether time synchronization between the source base station and the target base station will be performed. Therefore, the source base station may determine, according to the handover request acknowledgement information, whether the source base station needs to perform time synchronization with the target base station. In this way, content of the handover request acknowledgement information sent by the target base station is enriched, and flexibility in performing time synchronization between the source base station and the target base station in a handover process is improved.

Optionally, the sending handover request acknowledgement information to the source base station includes: sending the handover request acknowledgement information to the source base station. The handover request acknowledgement information includes synchronization information used to indicate time synchronization between the source base station and the target base station will be performed. The synchronization information includes a target preamble, uniquely identifying time synchronization, in a single root sequence. The synchronization information further instructs the source base station to send a handover command to user equipment UE, and the handover command includes the target preamble.

Optionally, before the sending handover request acknowledgement information to the source base station, the method further includes: detecting whether a root sequence on which no preamble allocation has been performed exists in a root sequence stored in the target base station. If the root sequence on which no preamble allocation has been performed exists in the root sequence stored in the target base station, the method further includes selecting a target root sequence from the root sequence on which no preamble allocation has been performed. The method further includes determining the target preamble in the target root sequence.

Optionally, the root sequence stored in the target base station includes a blind detection root sequence used for blind detection, and the detecting whether a root sequence on which no preamble allocation has been performed exists in a root sequence stored in the target base station includes detecting whether preamble allocation has been performed on the blind detection root sequence. The selecting a target root sequence from the root sequence on which no preamble allocation has been performed, if the root sequence on which no preamble allocation has been performed exists in the root sequence stored in the target base station, includes: if no preamble allocation has been performed on the blind detection root sequence, determining the blind detection root sequence as the target root sequence.

Optionally, the detecting, according to the handover request, whether a root sequence on which no preamble allocation has been performed exists in a root sequence stored in the target base station further includes: if preamble allocation has been performed on the blind detection root sequence, detecting whether a root sequence on which no preamble allocation has been performed exists in another root sequence stored in the target base station, where the another root sequence is a root sequence, different from the blind detection root sequence, in root sequences stored in the target base station; and if the root sequence on which no preamble allocation has been performed exists in the root sequence stored in the target base station, selecting the target root sequence from the root sequence on which no preamble allocation has been performed.

Optionally, the detecting whether a root sequence on which no preamble allocation has been performed exists in a root sequence stored in the target base station further includes: if the root sequence on which no preamble allocation has been performed does not exist in the root sequence stored in the target base station, sending the handover request acknowledgement information to the source base station. The handover request acknowledgement information includes target-preamble allocation failure information indicating that the source base station cannot perform time synchronization with the target base station.

Optionally, after sending the handover request acknowledgement information to the source base station, the method further includes: obtaining a first moment, where the first moment is a moment at which the target base station receives the target preamble sent by the UE; and sending the first moment to the source base station, so that the source base station calculates a time difference between the first moment and a second moment, and performs time adjustment according to the time difference. The second moment is a moment at which the target preamble sent by the UE to the target base station is detected by the source base station.

Optionally, the obtaining a first moment includes: receiving a random access message sent by the UE, where the random access message includes the target preamble; and determining a moment at which the target preamble is detected as the first moment. The sending the first moment to the source base station includes: sending a resource release message to the source base station, where the resource release message includes the first moment.

In conclusion, according to the time synchronization method provided in this embodiment of the present disclosure, the handover request acknowledgement information sent by the target base station to the source base station includes the information indicating whether time synchronization between the source base station and the target base station will be performed. Therefore, the source base station may determine, according to the handover request acknowledgement information, whether the source base station needs to perform time synchronization with the target base station. In this way, content of the handover request acknowledgement information sent by the target base station is enriched, and flexibility in performing time synchronization between the source base station and the target base station in a handover process is improved. In addition, the target base station may select, according to the handover request, the target root sequence from the root sequence that is stored in the target base station and on which no preamble allocation has been performed, and determine the target preamble in the target root sequence. Because the target preamble is a unique preamble in the target root sequence, accuracy of detecting the target preamble by the source base station is improved, and accuracy of time synchronization between the source base station and the target base station is improved.

Figures 1, 3:
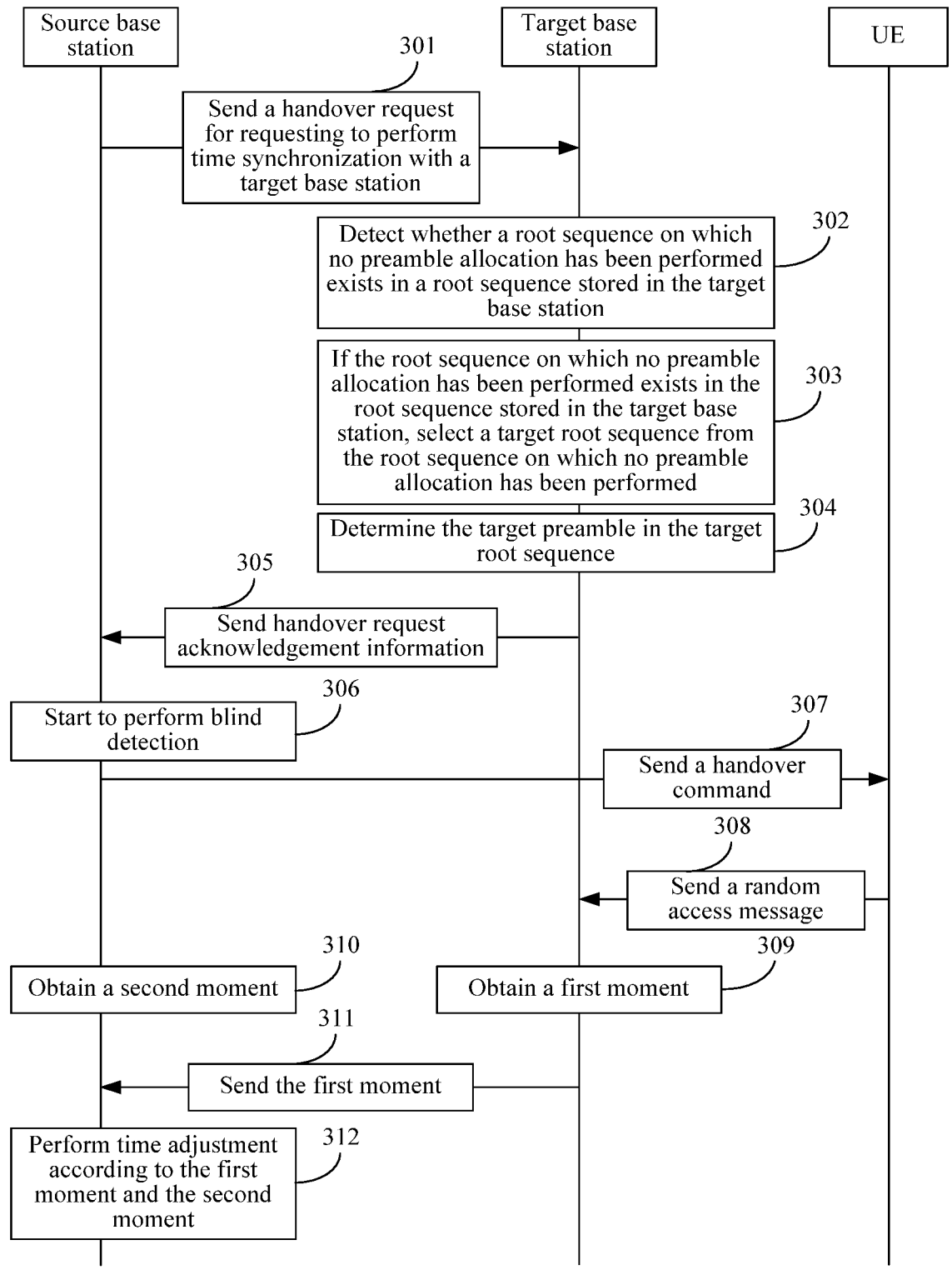
Figures 2, 3:
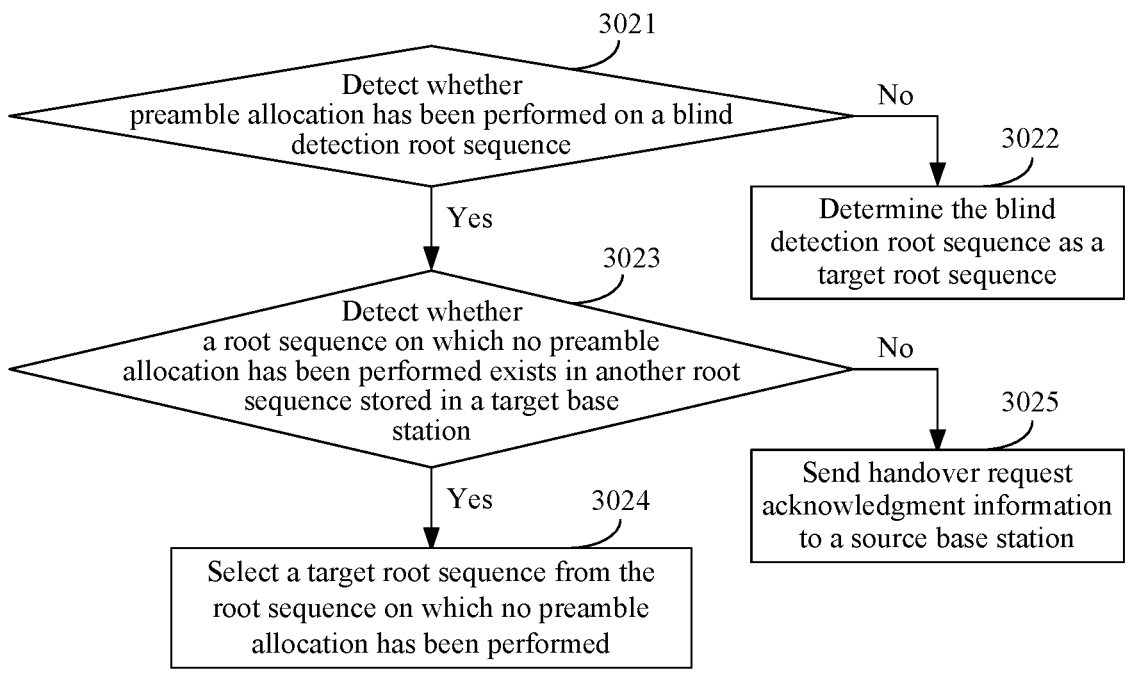
Figure 3:
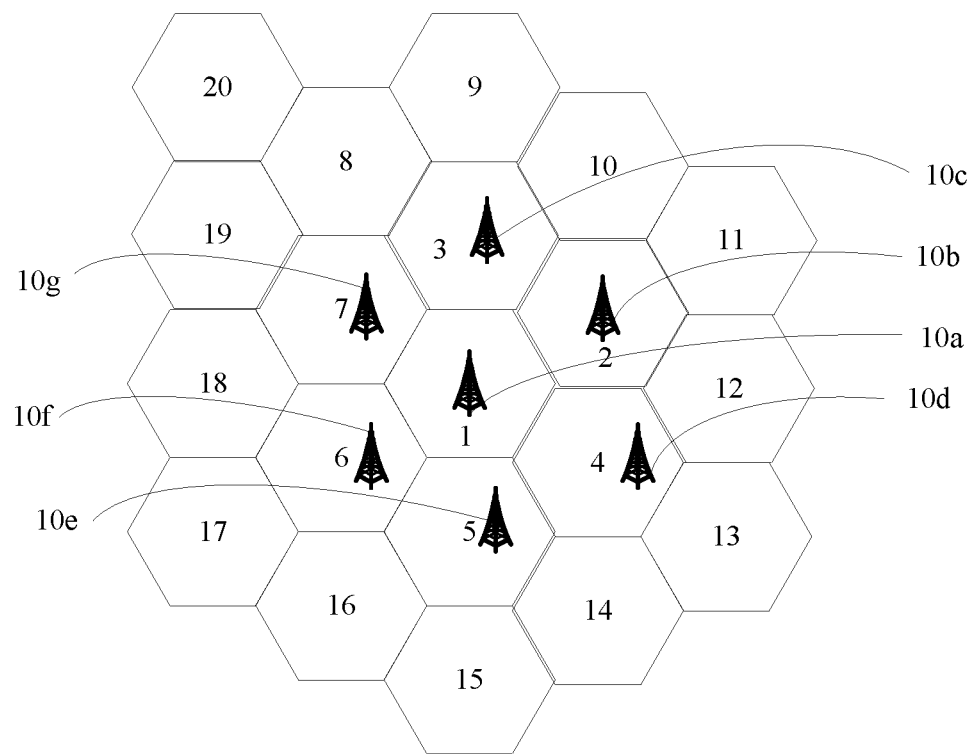

An embodiment of the present disclosure provides another time synchronization method, and the method may be applied to the time synchronization system shown in FIG. 1. As shown in FIG. 3-1, the method includes the following steps.

Step 301. A source base station sends, to a target base station, a handover request requesting to perform time synchronization with the target base station.

The source base station is a base station serving a cell in which UE currently resides. After accessing the cell (that is, a serving cell) covered by the source base station, the UE may continuously perform signal quality measurement on the serving cell and a cell adjacent to the serving cell (a neighboring cell). When signal quality of the neighboring cell is higher than a specific threshold of the serving cell and this case maintains for a period of time, the UE sends a neighboring cell detection report to the source base station. The source base station may select a designated base station as the target base station according to the neighboring cell detection report and send the handover request to the target base station. When the source base station receives a synchronization command sent by an upper-layer network, such as an operation, administration, and maintenance (OAM) entity or a mobility management entity (MME), the source base station may perform, in a process of handing over the UE from the source base station to the target base station, blind detection on a random access message sent by the UE to the target base station, and perform time synchronization with the target base station according to a blind detection result. Therefore, when receiving the synchronization command sent by the upper-layer network, the source base station may send, to the target base station, the handover request requesting to perform time synchronization with the target base station.

It should be noted that, for a specific process of sending, by the UE, the neighboring cell detection report to the source base station, reference may be made to a related technology. Details are not described herein in this embodiment of the present disclosure.

Step 302. The target base station detects whether a root sequence on which no preamble allocation has been performed exists in a root sequence stored in the target base station.

When the handover request received by the target base station is a handover request for requesting to perform time synchronization with the target base station, the target base station may determine that the source base station needs to perform blind detection on the random access message sent by the UE to the target base station. In this case, the target base station may detect whether a root sequence on which no preamble allocation has been performed exists in the stored root sequence. In this embodiment of the present disclosure, a specified quantity of preambles are configured in a serving cell of the target base station, and the specified quantity of preambles are obtained from the root sequence stored in the target base station. After receiving the handover request, the target base station may allocate a preamble to UE that needs to access the serving cell of the target base station. The preamble is used by the target base station to identify an identity of the UE when the UE randomly accesses the serving cell. Each time the target base station allocates a preamble, the target base station may mark the allocated preamble or record the allocated preamble.

For example, it is assumed that in an LTE system, 64 preambles are configured in the serving cell of the target base station for random access of the UE. The 64 preambles are obtained by performing cyclic shift on 839 root sequences according to a specified cyclic shift value, and each root sequence has a length of 839 bits. There are 16 preset cyclic shift values in each cell: {0, 13, 15, 18, 22, 26, 32, 38, 46, 59, 76, 93, 119, 167, 279, 419}. The target base station may calculate a cyclic shift length s according to a radius of the cell covered by the target base station, and then select, from the 16 preset cyclic shift values according to the cyclic shift length s, a larger value closest to s as the specified cyclic shift value. The target base station may calculate the cyclic shift length s by using Formula (1):

$$s=1.04875\times(6.67\times r+Tmd+2) \quad (1),$$

where r is the radius of the cell, in unit of a kilometer (km), Tmd is a maximum delay spread, in unit of a microsecond (us), and Tmd is usually 5 us. For example, it is assumed that the radius of the cell covered by the target base station is 10 km, and Tmd is 5 us. The cyclic shift length s may be obtained according to Formula (1): $s=1.04875\times(6.67\times10+5+2)=77.29$. Among the 16 preset cyclic shift values in each cell: {0, 13, 15, 18, 22, 26, 32, 38, 46, 59, 76, 93, 119, 167, 279, 419}, a larger value closest to s=77.29 is 93. Therefore, the target base station may determine that the specified cyclic shift value is 93, that is, the target base station may obtain a preamble from the root sequence after the root sequence is shifted by 93 bits every time. Because the length of each root sequence is 839 bits, after each root sequence is shifted by 93 bits every time, a quantity n of preambles that the target base station may obtain in each root sequence is: $n=\lfloor 839/93 \rfloor=9$, where $\lfloor \cdot \rfloor$ represents a rounding down operation. Because 64 preambles are required in each cell, and nine preambles may be obtained from each root sequence, a total quantity m of root sequences required is $m=\lceil 64/9 \rceil=8$, where $\lceil \cdot \rceil$ represents a rounding up operation. In this case, the target base station may obtain nine preambles from each of the first seven root sequences, and a total of 7×9=63 preambles may be obtained. Then, the target base station obtains one preamble from the eighth root sequence, and a requirement of 64 preambles required by the serving cell of the base station may be met.

For example, assuming that among the eight root sequences, preambles have been allocated to the first six root sequences, the target base station may detect, according to the allocated preambles marked in the six root sequences, the last two root sequences: the seventh root sequence and the eighth root sequence on which no preamble allocation has been performed.

Step 303. If the root sequence on which no preamble allocation has been performed exists in the root sequence stored in the target base station, select a target root sequence from the root sequence on which no preamble allocation has been performed.

If the root sequence on which no preamble allocation has been performed exists in the root sequence stored in the target base station, the target base station may randomly select, from the root sequence on which no preamble allocation has been performed, a root sequence as the target root sequence, or may select, from the root sequence on which no preamble allocation has been performed, a root sequence including a minimum quantity of preambles as the target root sequence. For example, the target base station may randomly select one root sequence from the seventh root sequence and the eighth root sequence as the target root sequence, or may select the eighth root sequence including only one preamble as the target root sequence.

It should be noted that if the root sequence on which no preamble allocation has been performed does not exist in the root sequence stored in the target base station, the source base station may send a target-preamble allocation failure message to the target base station. The target-preamble allocation failure message instructs the source base station to perform a general handover process without performing blind detection on the random access message sent by the UE to the target base station. That is, the source base station no longer performs time synchronization with the target base station. For example, after receiving the target-preamble allocation failure message, the source base station may perform an X2-interface application protocol (X2-AP)-based handover process. For the handover process, reference may be made to a related technology. Details are not described herein in this embodiment of the present disclosure.

In the related technology, a specified quantity of preambles are configured in the serving cell of the target base station. The specified quantity of preambles are obtained, according to a preset cyclic shift algorithm, from the root sequence stored in the target base station. According to the preset cyclic shift algorithm, the target base station may obtain the specified quantity of preambles from a specified quantity of root sequences. For the preset cyclic shift algorithm, reference may be made to step 302. In this embodiment of the present disclosure, the root sequence stored in the target base station may further include a blind detection root sequence used for blind detection. The blind detection root sequence may be a root sequence that is specified by the target base station from the specified quantity of stored root sequences and that is dedicated for blind detection; or the blind detection root sequence may be a root sequence that is allocated by the system to the target base station and that is dedicated for blind detection, and the root sequence is different from the specified quantity of root sequences stored in the target base station. For example, it is assumed that in an LTE system, 64 preambles are configured in the serving cell of the target base station for random access of the UE. For a serving cell with a radius of 5 km, a cyclic shift length s can be calculated according to Formula (1): s=1.04875×(6.67×5+5+2)=42. Among 16 preset cyclic shift values in each cell: {0, 13, 15, 18, 22, 26, 32, 38, 46, 59, 76, 93, 119, 167, 279, 419}, a larger value closest to s=42 is 46, and therefore, the target base station may determine that the specified cyclic shift value is 46. A quantity n of preambles that the target base station may obtain from each root sequence is n=⌊839/46⌋=18, and therefore, a total quantity m of root sequences required is m=⌈64/18⌉=4, and the $0^{th}$ to $53^{rd}$ preambles occupy the first three root sequences, and the $54^{th}$ to $63^{rd}$ root sequences occupy the last root sequence. In this embodiment of the present disclosure, the target base station may alternatively specify one of the four root sequences as a blind detection root sequence. For example, the target base station may specify the fourth root sequence as the blind detection root sequence. In addition, the system may alternatively additionally allocate, based on the four root sequences that have been stored in the target base station, a blind detection root sequence dedicated for blind detection. That is, the target base station may obtain 64 preambles from five root sequences, among the 64 preambles, the $0^{th}$ to $53^{rd}$ preambles occupy the first three root sequences, the $54^{th}$ to $62^{nd}$ preambles occupy the fourth root sequence, and the $63^{th}$ preamble occupies the last root sequence, that is, the blind detection root sequence.

It should be noted that when the root sequence stored in the target base station includes the blind detection root sequence used for blind detection, as shown in FIG. 3-2, step 302 and step 303 may be implemented by using the following method.

Step 3021. Detect whether preamble allocation has been performed on the blind detection root sequence.

After the target base station receives the handover request, sent by the source base station, for performing time synchronization with the target base station, the target base station may first detect whether preamble allocation has been performed on the blind detection root sequence. If no preamble allocation has been performed on the blind detection root sequence, step 3022 is performed; if preamble allocation has been performed on the blind detection root sequence, step 3023 is performed.

Step 3022. Determine the blind detection root sequence as a target root sequence.

If no preamble allocation has been performed on the blind detection root sequence, the target base station may directly determine the blind detection root sequence as the target root sequence.

Step 3023. Detect whether a root sequence on which no preamble allocation has been performed exists in another root sequence stored in the target base station.

The another root sequence is a root sequence, different from the blind detection root sequence, in root sequences stored in the target base station. If the root sequence on which no preamble allocation has been performed exists in the another root sequence stored in the target base station, step 3024 is performed. If the root sequence on which no preamble allocation has been performed does not exist in the another root sequence stored in the target base station, step 3025 is performed.

Step 3024. Select a target root sequence from the root sequence on which no preamble allocation has been performed.

If the root sequence on which no preamble allocation has been performed exists in the another root sequence stored in the target base station, the target base station may randomly select, from the root sequence on which no preamble allocation has been performed, a root sequence as the target root sequence, or may select, from the root sequence on which no preamble allocation has been performed, a root sequence including a minimum quantity of preambles as the target root sequence.

Step 3025. Send handover request acknowledgement information to the source base station.

The handover request acknowledgement information includes a target-preamble allocation failure message indicating that the source base station cannot perform time synchronization with the target base station. That is, the target-preamble allocation failure message may instruct the source base station to perform a general handover process without performing blind detection on the random access message sent by the UE to the target base station. For example, the source base station may perform an X2-AP-based handover process. For the handover process, reference may be made to a related technology. Details are not described herein in this embodiment of the present disclosure.

It should be noted that, in step 3021, if the target base station detects that preamble allocation has been performed on the blind detection root sequence, in addition to step 3023, step 3025 may be directly performed. That is, when preamble allocation has been performed on the blind detection root sequence, the target base station directly sends the target-preamble allocation failure message to the source base station without detecting another stored root sequence.

Step 304. The target base station determines the target preamble in the target root sequence.

In this embodiment of the present disclosure, after determining the target root sequence, the target base station may randomly select, from a preamble included in the target root sequence, a preamble as the target preamble and mark the target root sequence, so that the target base station no longer allocates a preamble in the target root sequence when receiving the handover request again. For example, the target base station may determine a target preamble in the target root sequence, that is, the eighth root sequence.

Step 305. The target base station sends handover request acknowledgement information to the source base station.

In this embodiment of the present disclosure, after the target base station determines the target preamble from the stored root sequence, the handover request acknowledgement information sent by the target base station to the source base station includes synchronization information indicating time synchronization between the source base station and the target base station will be performed, and the synchronization information includes a target preamble, uniquely identifying time synchronization, in a single root sequence. The synchronization information further instructs the source base station to send a handover command to user equipment (UE). The handover command includes a physical random access channel (PRACH) configuration parameter. The PRACH configuration parameter includes the target preamble. The synchronization information sent by the target base station to the source base station may further include an identifier of the target root sequence in which the target preamble exists, so that the source base station may determine the target root sequence according to the identifier, so as to perform blind detection according to the target root sequence. For example, the synchronization information sent by the target base station to the source base station may include a target preamble determined by the target base station in the eighth root sequence.

It should be noted that, in step 302 to step 304, if the target base station detects that the root sequence on which no preamble allocation is performed does not exist in the root sequence stored in the target base station, and the target preamble is not allocated successfully, in step 305, the handover request acknowledgement information sent by the target base station to the source base station may include a target-preamble allocation failure message indicating that the source base station cannot perform time synchronization with the target base station. That is, the target-preamble allocation failure message may instruct the source base station to perform a general handover process without performing blind detection on the random access message sent by the UE to the target base station. In addition, in an actual application, performing blind detection on the random access message by the source base station may be used for performing time synchronization with the target base station, or may be used for another purpose. Therefore, the target-preamble allocation failure message may also instruct the source base station to continue to perform blind detection without obtaining a time at which a preamble in the random access message is detected. That is, the source base station no longer performs blind detection used for time synchronization.

Step 306. The source base station starts to perform blind detection.

The source base station may start to perform blind detection after receiving the handover request acknowledgement information. Blind detection means that the source base station detects the random access message sent by the UE to the target base station. Because in a process of initiating random access to the target base station by the UE, there is multi-layer signaling interaction between the UE and the target base station. After the UE sends, to the target base station, the random access message including the target preamble, the target base station sends a random access response to the UE. The random access response may include a cell radio network temporary identifier (C-RNTI for short) allocated by the target base station to the UE. Therefore, the target base station can relatively accurately detect the target preamble in the random access message sent by the UE. However, for blind detection performed by the source base station, if the source base station detects two preambles from different UEs within a blind detection period and the two preambles are allocated by the target base station from a same root sequence, because there is no real-time signaling interaction between the source base station and the UEs, the source base station cannot distinguish specific UE that each of the two preambles comes from. Therefore, blind detection accuracy is relatively low.

In this embodiment of the present disclosure, the source base station may determine the target root sequence according to the received identifier of the target root sequence and detect, according to the target root sequence, the preamble in the random access message sent by the UE to the target base station. When the preamble detected by the source base station is the same as the preamble included in the target root sequence, the source base station may determine the detected preamble as the target preamble. Because the target preamble is a unique preamble in the target root sequence, when performing blind detection according to the target root sequence, the source base station does not determine a preamble in a random access message sent by another UE as the target preamble. In this case, accuracy of performing blind detection by the source base station is improved.

Step 307. The source base station sends a handover command to the UE.

The handover command includes the target preamble. After receiving the handover request acknowledgement message, the source base station may send the handover command to the UE. The handover command includes the PRACH configuration parameter sent by the target base station to the source base station, and the PRACH configuration parameter includes the target preamble allocated by the target base station to the UE. The handover command instructs the UE to be handed over to the target base station according to the PRACH configuration parameter.

Step 308. The UE sends a random access message to the target base station.

The random access message includes the target preamble. After receiving the handover command, the UE may send the random access message to the target base station, so as to access a serving cell of the target base station. The random access message further includes the target preamble.

Step 309. The target base station obtains a first moment.

The first moment is a moment at which the target preamble is detected by the target base station. The random access message sent by the UE and received by the target base station includes the target preamble. The target base station may determine the moment at which the target preamble is detected as the first moment.

Step 310. The source base station obtains a second moment.

The second moment is a moment at which the target preamble is detected by the source base station. After receiving the handover request acknowledgement information, the source base station may start to perform blind detection according to the target root sequence. When the UE sends the random access message to the target base station, the source base station may detect the target preamble in the random access message, and record a moment at which the target preamble is detected as the second moment. It should be noted that the second moment obtained by the source base station may be a moment recorded by a clock of the source base station when the target preamble is detected. The source base station may alternatively obtain the second moment by means of calculation according to a second system frame number, a second subframe number, and a second intra-subframe offset that are recorded when the target preamble is detected.

Step 311. The target base station sends the first moment to the source base station.

After receiving the random access message sent by the UE, the target base station determines that the UE accesses the serving cell of the target base station, and may send a resource release message to the source base station, to inform the source base station that the UE is handed over successfully. The resource release message includes the first moment at which the target preamble is detected by the target base station.

It should be noted that the target base station may determine a moment recorded by a clock of the target base station when the target preamble is detected as the first moment, and send the first moment to the source base station. The target base station may further send, to the source base station, a first system frame number, a first subframe number, and a first intra-subframe offset that are recorded when the target preamble is detected, so that the source base station may perform time adjustment according to the first system frame number, the first subframe number, and the first intra-subframe offset.

Step 312. The source base station performs time adjustment according to the first moment and the second moment.

After receiving the first moment sent by the target base station, the source base station may calculate a time difference between the first moment and the second moment: the time difference=the first moment−the second moment, and adjust time of the source base station according to the time difference, so as to implement time synchronization between the source base station and the target base station. In addition, after receiving the first moment sent by the target base station, the source base station may further send the first moment, the second moment, and identifiers of the source base station and the target base station to a base station controller. The base station controller calculates the time difference between the first moment and the second moment, and sends the calculated time difference to the source base station according to the identifier of the source base station. In this case, the source base station may perform time adjustment according to the time difference, so as to implement time synchronization between the source base station and the target base station.

It should be noted that, because the source base station may also record the second system frame number, the second subframe number, and the second intra-subframe offset when the target preamble is detected, when the resource release message received by the source base station includes the first system frame number, the first subframe number, and the first intra-subframe offset that are sent by the target base station, the source base station may obtain the time difference between the source base station and the target base station by means of calculation according to the second system frame number, the second subframe number, the second intra-subframe offset, the first system frame number, the first subframe number, and the first intra-subframe offset. For example, it is assumed that the first system frame number is F1, the first subframe number is SF1, the first intra-subframe offset is offset1, the second system frame number is F2, the second subframe number is SF2, the second intra-subframe offset is offset2, a length of each system frame is 10 milliseconds (ms), and a length of each subframe is 1 ms. The intra-subframe offsets offset1 and offset2 may be set according to an actual situation of the base stations. For example, both offset1 and offset2 may be 0.05 ms, and the time difference between the source base station and the target base station can be calculated by using Formula (2):

$$\text{Time difference}=(F1-F2)\times 10 \text{ ms}+(SF1-SF2)\times 1 \text{ ms}+(\text{offset1}-\text{offset2}) \quad (2).$$

It should also be noted that, when the UE is handed over from the source base station to the target base station, in this embodiment of the present disclosure, a distance between the UE and the source base station is equal to a distance between the UE and the target base station by default. Therefore, when the UE sends the random access message to the target base station, the first moment at which the target preamble in the random access message is detected by the target base station should be the same as the second moment at which the target preamble is detected by the source base station. If the first moment and the second moment are not the same, it indicates that time synchronization is not implemented between the source base station and the target base station. In this case, the source base station may perform time adjustment according to the time difference between the first moment and the second moment, so as to implement time synchronization between the source base station and the target base station.

In an actual application, after sending the handover request to the target base station, the source base station may further trigger the UE to initiate random access to the source base station, and obtain a second transmission delay caused when the UE sends the random access message to the source base station. Similarly, when obtaining the first moment, the target base station may further obtain a first transmission delay caused when the UE sends the target preamble to the target base station. Then, the target base station may send the first transmission delay and the first moment to the source base station, and the source base station may calculate the time difference between the source base station and the target base station according to the first moment, the first transmission delay, the second moment, and the second transmission delay by using Formula (3):

$$\text{Time difference}=(\text{first moment}-\text{second moment})-(\text{first transmission delay}-\text{second transmission delay}) \quad (3).$$

In consideration of the delays caused during transmission between the UE and the target base station and between the UE and the source base station, accuracy of time synchronization between the source base station and the target base station can be further improved. For specific processes of obtaining the second transmission delay by the source base station and obtaining the first transmission delay by the target base station, reference may be made to a related technology. Details are not described herein in this embodiment of the present disclosure.

In conclusion, according to the time synchronization method provided in this embodiment of the present disclosure, the handover request acknowledgement information sent by the target base station to the source base station includes the information indicating whether time synchronization between the source base station and the target base station will be performed. Therefore, the source base station may determine, according to the handover request acknowledgement information, whether the source base station needs to perform time synchronization with the target base station. In this way, content of the handover request acknowledgement information sent by the target base station is enriched, and flexibility in performing time synchronization between the source base station and the target base station in a handover process is improved. In addition, the target base station may select, according to the handover request, the target root sequence from the root sequence that is stored in the target base station and on which no preamble allocation has been performed, and determine the target preamble in the target root sequence. Because the target preamble is a unique preamble in the target root sequence, accuracy of detecting the target preamble by the source base station is improved, and accuracy of time synchronization between the source base station and the target base station is improved.

It should be noted that, an order of the steps of the time synchronization method provided in this embodiment of the present disclosure may be adjusted appropriately, or a step may be added or may be removed according to a situation. For example, step 306 and step 307 may be performed simultaneously, and step 309 and step 310 may also be performed simultaneously. Any modified method readily figured out by a person skilled in the art within the technical scope disclosed in the present disclosure shall fall within the protection scope of the present disclosure. Therefore, details are not described.

The time synchronization method provided in this embodiment of the present disclosure may also be applied to the wireless communications network shown in FIG. 3-3. The wireless communications network may be a Long Term Evolution (LTE) network, or may be an LTE-Advanced network. In the wireless communications network, several base stations (for example, a base station 10a, a base station 10b, and a base station 10c) and another network entity (for example, a core network device, which is not shown in FIG. 3-3) are included for supporting the several UEs in performing communication. The several base stations may be evolved NodeBs in an LTE system. In the wireless communications network, one base station may support or manage one or more cells, and each base station can serve a plurality of UEs. In FIG. 3-3, for example, there are a total of 20 cells numbered from 1 to 20 in the wireless communications network. One base station is configured for each cell. For example, base stations 10a to 10g are located in the cell 1 to cell 7, respectively. To implement time synchronization between base stations in the network, one base station may be selected as a reference point, and time of another base station is adjusted to be consistent with time of the base station. The base station selected as the reference point is referred to as a reference base station, and another base station is referred to as a non-reference base station. For example, assuming that the base station boa located in the cell 1 is selected as the reference base station, the base station 10a may implement time synchronization with the base station 10b, the base station 10c, the base station 10d, the base station 10e, the base station 10f, and the base station bog around the base station boa by using the time synchronization method provided in this embodiment of the present disclosure. Then, the base station bob to the base station bog may continue to perform time synchronization with surrounding base stations by using the time synchronization method provided in this embodiment of the present disclosure. Finally, time synchronization between all base stations and the reference base station in the wireless communications network is implemented.

Figures 1, 4:
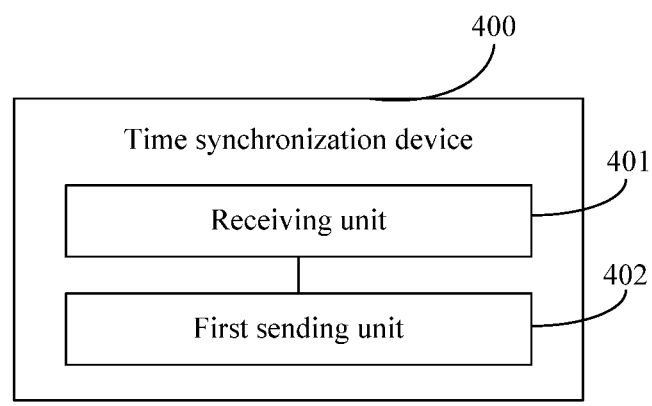
Figures 2, 4:
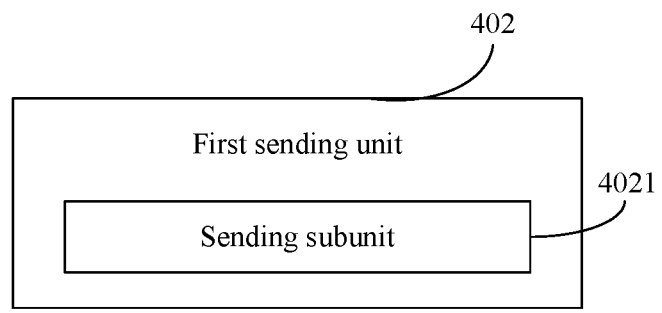
Figures 3, 4:
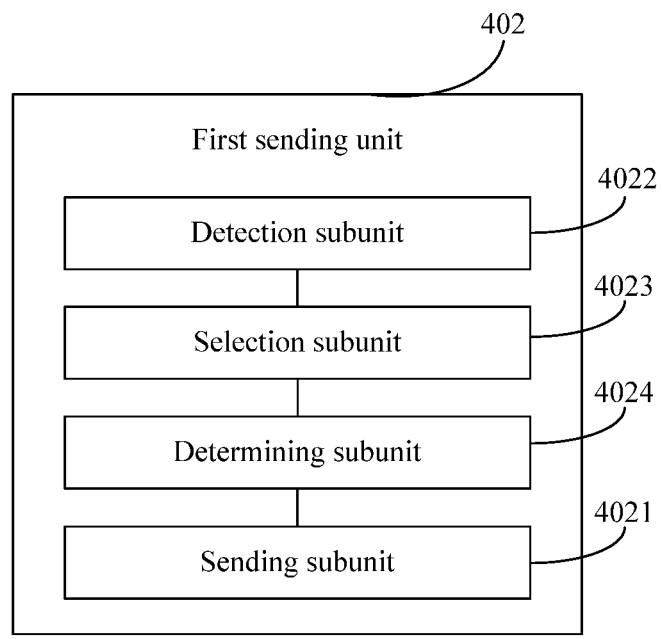
Figure 4:
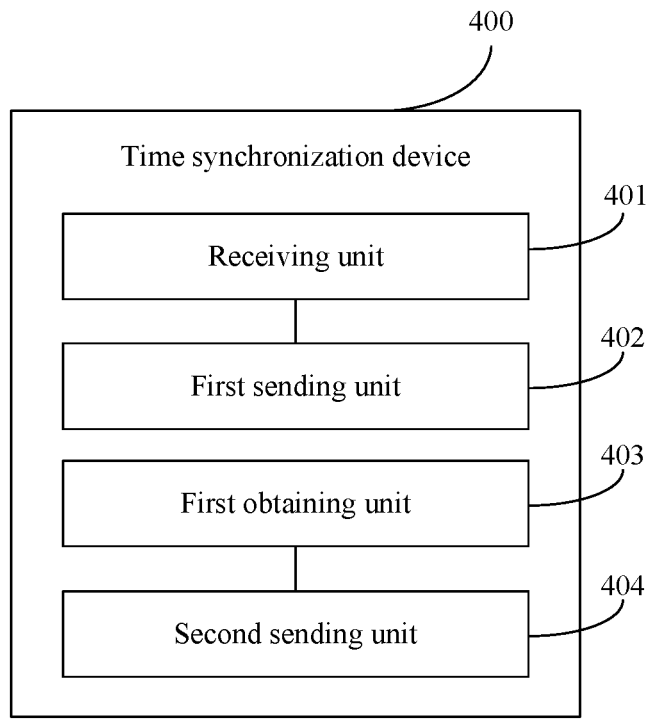

An embodiment of the present disclosure provides a time synchronization device 400 that is used for a target base station. As shown in FIG. 4, the time synchronization device 400 includes a receiving unit 401 and a first sending unit 402.

The receiving unit 401 is configured to receive a handover request, sent by a source base station, for requesting to perform time synchronization with the target base station.

The first sending unit 402 is configured to send handover request acknowledgement information to the source base station, where the handover request acknowledgement information includes information indicating whether time synchronization between the source base station and the target base station will be performed.

In conclusion, according to the time synchronization device provided in this embodiment of the present disclosure, the handover request acknowledgement information sent by the target base station to the source base station using the first sending unit includes the information indicating whether the source base station needs to perform time synchronization with the target base station. Therefore, the source base station may determine, according to the handover request acknowledgement information, whether the source base station needs to perform time synchronization with the target base station. In this way, content of the handover request acknowledgement information sent by the target base station is enriched, and flexibility in performing time synchronization between the source base station and the target base station in a handover process is improved.

Optionally, as shown in FIG. 4-2, the first sending unit 402 includes a sending subunit 4021, configured to send the handover request acknowledgement information to the source base station. The handover request acknowledgement information includes synchronization information indicating time synchronization between the source base station and the target base station will be performed. The synchronization information includes a target preamble, used to uniquely identify time synchronization, in a single root sequence. The synchronization information further instructs the source base station to send a handover command to user equipment UE, and the handover command includes the target preamble.

Optionally, as shown in FIG. 4-3, the first sending unit 402 further includes a detection subunit 4022, a selection subunit 4023, a determining subunit 4024, and a sending subunit 4021.

The detection subunit 4022 is configured to detect, according to the handover request, whether a root sequence on which no preamble allocation has been performed exists in a root sequence stored in the target base station.

The selection subunit 4023 is configured to, if the root sequence on which no preamble allocation has been performed exists in the root sequence stored in the target base station, select a target root sequence from the root sequence on which no preamble allocation has been performed.

The determining subunit 4024 is configured to determine the target preamble in the target root sequence.

The sending subunit 4021 is configured to send the handover request acknowledgement information to the source base station. The handover request acknowledgement information includes synchronization information indicating time synchronization between the source base station and the target base station will be performed. The synchronization information includes a target preamble, uniquely identifying time synchronization, in a single root sequence. The synchronization information further instructs the source base station to send a handover command to user equipment UE, and the handover command includes the target preamble.

Optionally, the root sequence stored in the target base station includes a blind detection root sequence used for blind detection.

The detection subunit 4022 is further configured to: detect, according to the handover request, whether preamble allocation has been performed on the blind detection root sequence.

The selection subunit 4023 is further configured to: when no preamble allocation has been performed on the blind detection root sequence, determine the blind detection root sequence as the target root sequence.

Optionally, the detection subunit 4022 is further configured to, when preamble allocation has been performed on the blind detection root sequence, detect whether a root sequence on which no preamble allocation has been performed exists in another root sequence stored in the target base station, where the another root sequence is a root sequence, different from the blind detection root sequence, in root sequences stored in the target base station; and when the root sequence on which no preamble allocation has been performed exists in the root sequence stored in the target base station, select the target root sequence from the root sequence on which no preamble allocation has been performed.

Optionally, the detection subunit 4022 is further configured to: when the root sequence on which no preamble allocation has been performed does not exist in the root sequence stored in the target base station, send the handover request acknowledgement information to the source base station. The handover request acknowledgement information includes target-preamble allocation failure information indicating that the source base station cannot perform time synchronization with the target base station.

An embodiment of the present disclosure provides another time synchronization device 400 that is used for a target base station. As shown in FIG. 4-4, the time synchronization device 400 includes a receiving unit 401, a first sending unit 402, a first obtaining unit 403, and a second sending unit 404.

The receiving unit 401 is configured to receive a handover request sent by a source base station.

The first sending unit 402 is configured to send handover request acknowledgement information to the source base station, where the handover request acknowledgement information includes information indicating whether the source base station needs to perform time synchronization with the target base station.

The first obtaining unit 403 is configured to obtain a first moment, where the first moment is a moment at which the target base station receives a target preamble sent by UE.

The second sending unit 404 is configured to send the first moment to the source base station, so that the source base station calculates a time difference between the first moment and a second moment, and performs time adjustment according to the time difference. The second moment is a moment at which the target preamble sent by the UE to the target base station is detected by the source base station.

Optionally, the first obtaining unit 403 is configured to: receive a random access message sent by the UE, where the random access message includes the target preamble; and determine a moment at which the target preamble is detected as the first moment.

The second sending unit 404 is configured to: send a resource release message to the source base station, where the resource release message includes the first moment.

In conclusion, according to the time synchronization device provided in this embodiment of the present disclosure, the handover request acknowledgement information sent by the target base station to the source base station includes the information indicating whether time synchronization between the source base station and the target base station will be performed. Therefore, the source base station may determine, according to the handover request acknowledgement information, whether the source base station needs to perform time synchronization with the target base station. In this way, content of the handover request acknowledgement information sent by the target base station is enriched, and flexibility in performing time synchronization between the source base station and the target base station in a handover process is improved. In addition, the target base station may select, according to the handover request, the target root sequence from the root sequence that is stored in the target base station and on which no preamble allocation has been performed, and determine the target preamble in the target root sequence. Because the target preamble is a unique preamble in the target root sequence, accuracy of detecting the target preamble by the source base station is improved, and accuracy of time synchronization between the source base station and the target base station is improved.

Figure 5:
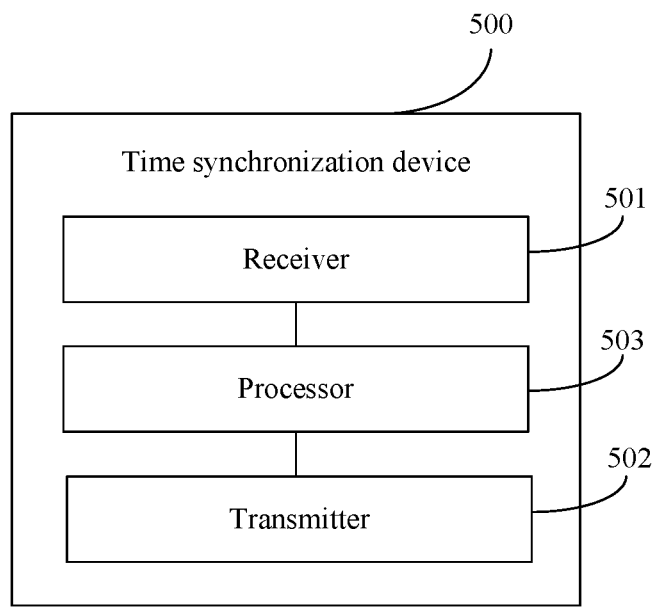
FIG. 5 is a schematic structural diagram of still another time synchronization device according to an embodiment of the present disclosure.

An embodiment of the present disclosure provides still another time synchronization device 500 that is used for a target base station. As shown in FIG. 5, the time synchronization device 500 includes a receiver 501, a transmitter 502, and a processor 503.

The receiver 501 is configured to receive a handover request, sent by a source base station, for requesting to perform time synchronization with the target base station.

The transmitter 502 is configured to send handover request acknowledgement information to the source base station. The handover request acknowledgement information includes information indicating whether the source base station will perform time synchronization with the target base station.

In conclusion, according to the time synchronization device provided in this embodiment of the present disclosure, the handover request acknowledgement information sent by the target base station to the source base station by using the transmitter includes the information indicating whether time synchronization between the source base station and the target base station will be performed. Therefore, the source base station may determine, according to the handover request acknowledgement information, whether the source base station needs to perform time synchronization with the target base station. In this way, content of the handover request acknowledgement information sent by the target base station is enriched, and flexibility in performing time synchronization between the source base station and the target base station in a handover process is improved.

Optionally, the transmitter 502 is further configured to: send the handover request acknowledgement information to the source base station, where the handover request acknowledgement information includes synchronization information indicating time synchronization between the source base station and the target base station will be performed. The synchronization information includes a target preamble, uniquely identifying time synchronization, in a single root sequence. The synchronization information further instructs the source base station to send a handover command to user equipment (UE), and the handover command includes the target preamble.

Optionally, the processor 503 is further configured to: detect whether a root sequence on which no preamble allocation has been performed exists in a root sequence stored in the target base station; when the root sequence on which no preamble allocation has been performed exists in the root sequence stored in the target base station, select a target root sequence from the root sequence on which no preamble allocation has been performed; and determine the target preamble in the target root sequence.

Optionally, the root sequence stored in the target base station includes a blind detection root sequence used for blind detection. The processor 503 is further configured to:

detect, according to the handover request, whether preamble allocation has been performed on the blind detection root sequence.

The processor 503 is further configured to: when no preamble allocation has been performed on the blind detection root sequence, determine the blind detection root sequence as the target root sequence.

Optionally, the processor 503 is further configured to: when preamble allocation has been performed on the blind detection root sequence, detect whether a root sequence on which no preamble allocation has been performed exists in another root sequence stored in the target base station, where the another root sequence is a root sequence, different from the blind detection root sequence, in root sequences stored in the target base station; and when the root sequence on which no preamble allocation has been performed exists in the root sequence stored in the target base station, select the target root sequence from the root sequence on which no preamble allocation has been performed.

Optionally, the transmitter 502 is further configured to: when the root sequence on which no preamble allocation has been performed does not exist in the root sequence stored in the target base station, send the handover request acknowledgement information to the source base station. The handover request acknowledgement information includes target-preamble allocation failure information indicating that the source base station cannot perform time synchronization with the target base station.

Optionally, the processor 503 is further configured to: obtain a first moment, where the first moment is a moment at which the target base station receives the target preamble sent by the UE.

The transmitter 502 is further configured to send the first moment to the source base station, so that the source base station calculates a time difference between the first moment and a second moment, and performs time adjustment according to the time difference. The second moment is a moment at which the target preamble sent by the UE to the target base station is detected by the source base station.

Optionally, the processor 503 is further configured to receive a random access message sent by the UE, where the random access message includes the target preamble; and determine a moment at which the target preamble is detected as the first moment.

The transmitter 502 is further configured to send a resource release message to the source base station, where the resource release message includes the first moment.

In conclusion, according to the time synchronization device provided in this embodiment of the present disclosure, the handover request acknowledgement information sent by the target base station to the source base station includes the information indicating whether time synchronization between the source base station and the target base station will be performed. Therefore, the source base station may determine, according to the handover request acknowledgement information, whether the source base station needs to perform time synchronization with the target base station. In this way, content of the handover request acknowledgement information sent by the target base station is enriched, and flexibility in performing time synchronization between the source base station and the target base station in a handover process is improved. In addition, the target base station may select, according to the handover request, the target root sequence from the root sequence that is stored in the target base station and on which no preamble allocation has been performed, and determine the target preamble in the target root sequence. Because the target preamble is a unique preamble in the target root sequence, accuracy of detecting the target preamble by the source base station is improved, and accuracy of time synchronization between the source base station and the target base station is improved.

For the device in the foregoing embodiment, a specific manner of executing operations by each unit is described in detail in the embodiments that relate to the method, and details are not described herein again.

An embodiment of the present disclosure provides a time synchronization system, including a source base station, a target base station, and user equipment, where the target base station includes the time synchronization device 400 shown in FIG. 4-1 or FIG. 4-4.

An embodiment of the present disclosure provides another time synchronization system, including a source base station, a target base station, and user equipment, where the target base station includes the time synchronization device 500 shown in FIG. 5.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely example embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. A method comprising:
   receiving, by a target base station, a handover request from a source base station, wherein the handover request requests to perform time synchronization between the target base station and the source base station; and
   sending, by the target base station, handover request acknowledgement information to the source base station, wherein the handover request acknowledgement information comprises information indicating whether time synchronization between the source base station and the target base station will be performed, and sending the handover request acknowledgement information to the source base station comprises:
      sending the handover request acknowledgement information to the source base station, wherein the handover request acknowledgement information comprises synchronization information indicating time synchronization between the source base station and the target base station will be performed, the synchronization information comprises a target preamble uniquely identifying time synchronization in a single root sequence, the synchronization information instructs the source base station to send a handover command to user equipment (UE), and the handover command comprises the target preamble.

2. The method according to claim 1, wherein after sending the handover request acknowledgement information to the source base station, the method further comprises:
   obtaining a first moment, wherein the first moment is a moment at which the target base station receives the target preamble from the UE; and
   sending the first moment to the source base station, wherein the source base station calculates a time difference between the first moment and a second moment, and performs time adjustment according to the time difference, wherein the second moment is a moment at which the target preamble sent by the UE to the target base station is detected by the source base station.

3. The method according to claim 2, wherein obtaining the first moment comprises:
receiving a random access message from the UE, wherein the random access message comprises the target preamble; and
determining a moment at which the target preamble is detected as the first moment; and
wherein sending the first moment to the source base station comprises:
sending a resource release message to the source base station, wherein the resource release message comprises the first moment.

4. The method according to claim 1, wherein before sending the handover request acknowledgement information to the source base station, the method further comprises:
detecting whether any root sequence on which no preamble allocation has been performed exists in one or more root sequences stored in the target base station;
when it is detected that at least one root sequence on which no preamble allocation has been performed exists in the one or more root sequences stored in the target base station, selecting a target root sequence from the at least one root sequence on which no preamble allocation has been performed; and
determining the target preamble in the target root sequence.

5. The method according to claim 4, wherein the one or more root sequences stored in the target base station comprises a blind detection root sequence for blind detection;
wherein detecting whether any root sequence on which no preamble allocation has been performed exists in the one or more root sequences stored in the target base station comprises:
detecting whether preamble allocation has been performed on the blind detection root sequence; and
wherein selecting the target root sequence from the at least one root sequence on which no preamble allocation has been performed, when it is detected that the at least one root sequence on which no preamble allocation has been performed exists in the one or more root sequences stored in the target base station, comprises:
when no preamble allocation has been performed on the blind detection root sequence, determining the blind detection root sequence as the target root sequence.

6. The method according to claim 5, wherein detecting whether any root sequence on which no preamble allocation has been performed exists in the one or more root sequences stored in the target base station further comprises:
when preamble allocation has been performed on the blind detection root sequence, detecting whether any root sequence on which no preamble allocation has been performed exists in another root sequence stored in the target base station, wherein the another root sequence is different from the blind detection root sequence and comprised in the one or more root sequences stored in the target base station; and
when at least one root sequence on which no preamble allocation has been performed exists in the another root sequence stored in the target base station, selecting the target root sequence from the at least one root sequence on which no preamble allocation has been performed that exists in the another root sequence.

7. A device, comprising:
a transmitter;
a receiver; and
a processor;
wherein the receiver is configured to receive a handover request, from a source base station, that requests to perform time synchronization between the source base station and a target base station;
wherein the transmitter is configured to send handover request acknowledgement information to the source base station, wherein the handover request acknowledgement information comprises information indicating whether time synchronization between the source base station and the target base station will be performed, and sending the handover request acknowledgement information to the source base station comprises:
sending the handover request acknowledgement information to the source base station, wherein the handover request acknowledgement information comprises synchronization information indicating time synchronization between the source base station and the target base station will be performed, the synchronization information comprises a target preamble uniquely identifying time synchronization in a single root sequence, the synchronization information instructs the source base station to send a handover command to user equipment (UE), and the handover command comprises the target preamble; and
wherein the device is comprised in a target base station.

8. The device according to claim 7, wherein the processor is further configured to:
obtain a first moment, wherein the first moment is a moment at which the target base station receives the target preamble from the UE; and
wherein the transmitter is further configured to send the first moment to the source base station, wherein the source base station calculates a time difference between the first moment and a second moment, and performs time adjustment according to the time difference, wherein the second moment is a moment at which the target preamble sent by the UE to the target base station is detected by the source base station.

9. The device according to claim 8, wherein the processor is further configured to:
receive a random access message from the UE, wherein the random access message comprises the target preamble; and
determine a moment at which the target preamble is detected as the first moment; and
wherein the transmitter is further configured to:
send a resource release message to the source base station, wherein the resource release message comprises the first moment.

10. The device according to claim 7, wherein the processor is configured to:
detect whether any root sequence on which no preamble allocation has been performed exists in one or more root sequences stored in the target base station;
when it is detected that at least one root sequence on which no preamble allocation has been performed exists in the one or more root sequence stored in the target base station, select a target root sequence from the at least one root sequence on which no preamble allocation has been performed; and
determine the target preamble in the target root sequence.

11. The device according to claim 10, wherein the at least one root sequence stored in the target base station comprises a blind detection root sequence for blind detection; and
wherein the processor is further configured to:
detect whether preamble allocation has been performed on the blind detection root sequence; and
when no preamble allocation has been performed on the blind detection root sequence, determine the blind detection root sequence as the target root sequence.

12. The device according to claim 11, wherein the processor is further configured to:
when preamble allocation has been performed on the blind detection root sequence, detect whether any root sequence on which no preamble allocation has been performed exists in another root sequence stored in the target base station, wherein the another root sequence is different from the blind detection root sequence and comprised in the one or more root sequences stored in the target base station; and
when at least one root sequence on which no preamble allocation has been performed exists in the another root sequence stored in the target base station, select the target root sequence from the at least one root sequence on which no preamble allocation has been performed that exists in the another root sequence.

13. A system, comprising:
a source base station;
a target base station; and
user equipment;
wherein the target base station is configured to:
receive a handover request, from the source base station, that requests to perform time synchronization between the target base station and the source base station;
send handover request acknowledgement information to the source base station, wherein the handover request acknowledgement information comprises information indicating whether time synchronization between the source base station and the target base station will be performed;
detect whether any root sequence on which no preamble allocation has been performed exists in one or more root sequences stored in the target base station;
when it is detected that at least one root sequence on which no preamble allocation has been performed exists in the one or more root sequence stored in the target base station, select a target root sequence from the at least one root sequence on which no preamble allocation has been performed; and
determine a target preamble in the target root sequence.

14. The system according to claim 13, wherein the at least one root sequence stored in the target base station comprises a blind detection root sequence for blind detection; and
wherein the target base station is further configured to:
detect whether preamble allocation has been performed on the blind detection root sequence; and
when no preamble allocation has been performed on the blind detection root sequence, determine the blind detection root sequence as the target root sequence.

15. The system according to claim 14, wherein the target base station is further configured to:
when preamble allocation has been performed on the blind detection root sequence, detect whether any root sequence on which no preamble allocation has been performed exists in another root sequence stored in the target base station, wherein the another root sequence is different from the blind detection root sequence and comprised in the one or more root sequences stored in the target base station; and
when at least one root sequence on which no preamble allocation has been performed exists in the another root sequence stored in the target base station, select the target root sequence from the at least one root sequence on which no preamble allocation has been performed that exists in the another root sequence.

* * * * *